United States Patent [19]

Murdock

[11] 4,273,016
[45] Jun. 16, 1981

[54] DOOR CUTTING TEMPLATE

[76] Inventor: Mark W. Murdock, P.O. Box F, Lake Arrowhead, Calif. 92352

[21] Appl. No.: 116,905

[22] Filed: Jan. 30, 1980

[51] Int. Cl.³ ............................................... B27B 9/04
[52] U.S. Cl. ........................................ 83/743; 83/485; 83/574; 33/194
[58] Field of Search ................................ 83/743–745, 83/762, 764, 829, 455, 574, 485; 33/194

[56] References Cited

U.S. PATENT DOCUMENTS

| | | | |
|---|---|---|---|
| 2,942,633 | 6/1960 | King | 83/745 |
| 3,011,530 | 12/1961 | Lamb | 83/745 |
| 3,834,034 | 9/1974 | Berquist | 33/194 |

Primary Examiner—Frank T. Yost
Attorney, Agent, or Firm—K. H. Boswell

[57] ABSTRACT

A template used in assisting in cutting off a bottom of a door so that the bottom of the door is parallel with the floor, but is raised a sufficient distance from the floor to allow a floor covering to be installed on the floor has an elongated member sized to fit across the width of one of the face surfaces of the door. The elongated member includes an elongated slot or opening extending across it and this slot or opening is normally parallel to the bottom edge of the elongated member. A retaining member located on one end of the elongated member fixedly holds the elongated member to the door in respect to movement of the elongated member away from the door in a direction perpendicular to the door face but allows movement of the elongated member across the surface of the door in a direction coplanar with both the face of the door and the elongated member. When a saw, preferredly a hand-held circular saw, is fitted to the elongated member, one edge of the baseplate of the saw follows either the floor or a second member mounted on the bottom edge of the elongated member and the blade of the saw follows the slot. The saw cuts the door parallel then to either the floor or the baseplate.

11 Claims, 6 Drawing Figures

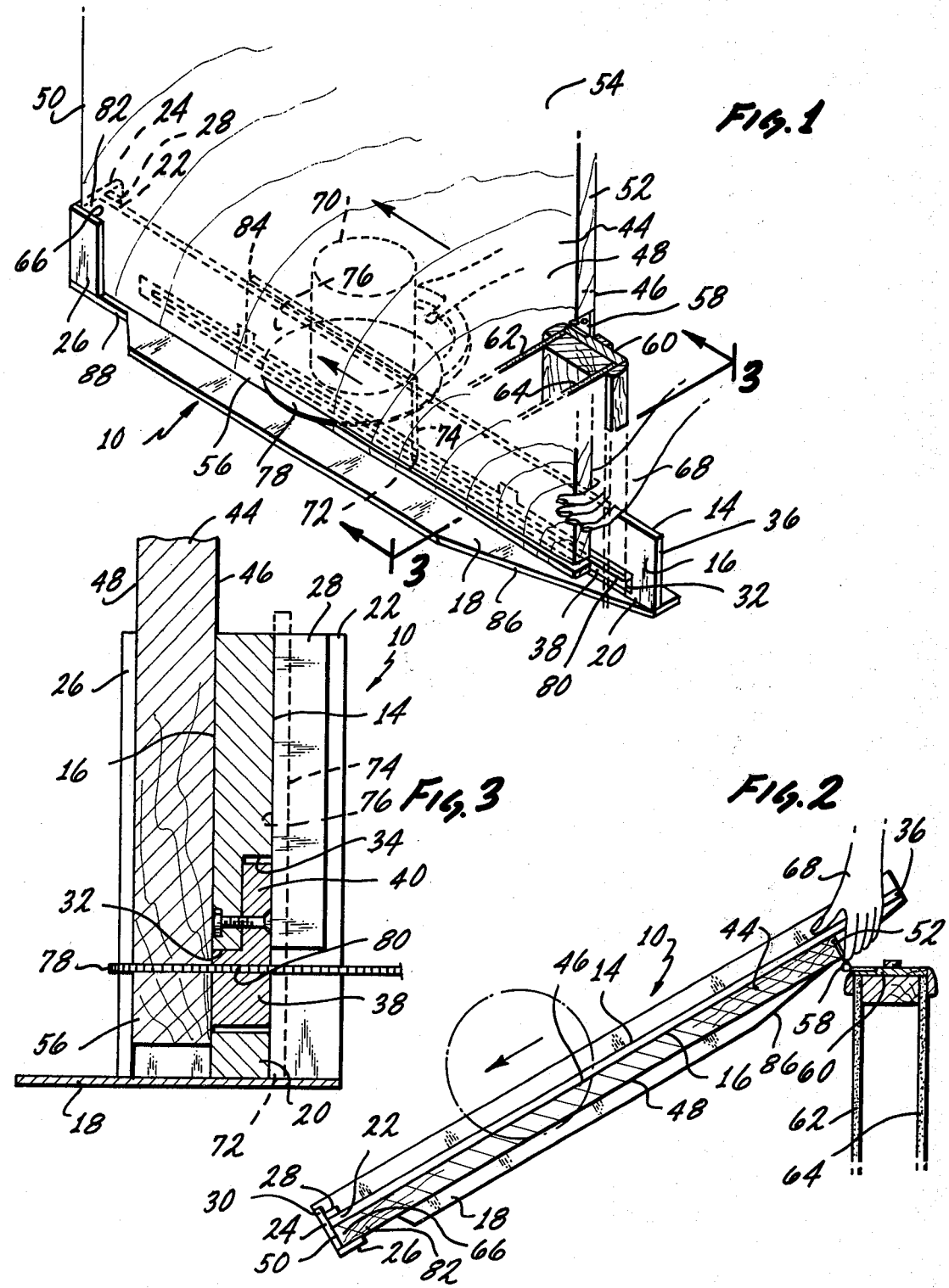

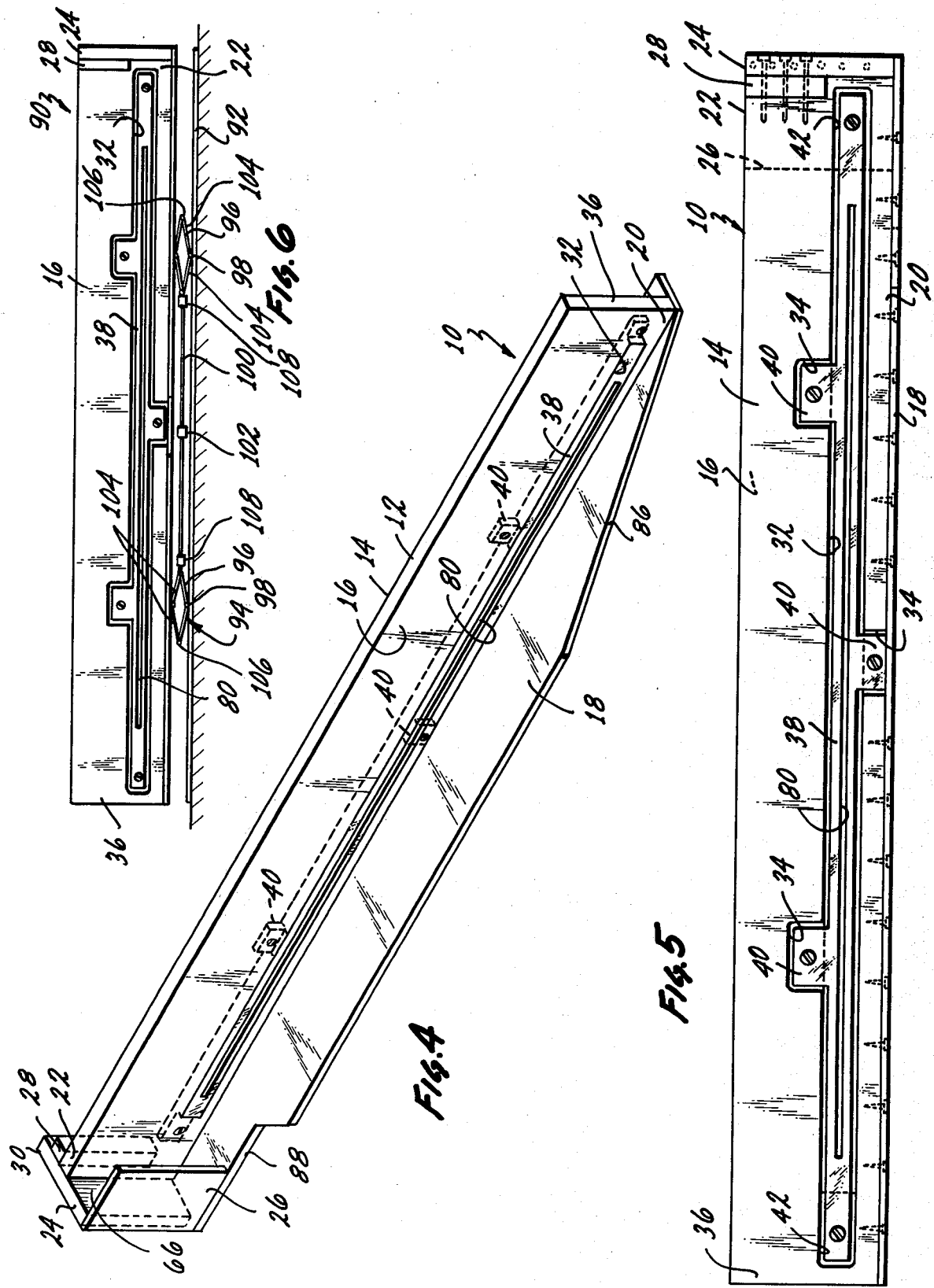

DOOR CUTTING TEMPLATE

BACKGROUND OF THE INVENTION

A door cutting guide used in conjunction with a saw to cut a door has a slot in it in which the blade of a saw travels and includes surfaces on the guide which interact with the baseplate of the saw in making a straight cut through the door. The door cutting guide is useful in sawing off the bottoms of doors allowing them to freely open and close across rugs or other raised surfaces.

In constructing new structures it is the practice to hang or suspend standard size doors within standard size frames. When the interior decoration of the structure is decided upon, the floor surface of the rooms which the door separates may be covered with a fairly thin material such as a linoleum or a tile, or may be covered with thicker material such as a carpet and its accompanying carpet pad. In order to accommodate the floor covering it may be necessary to cut off the bottom of the door to allow the door to freely open and close without binding against the floor covering.

It used to be standard construction practice to carefully size a door prior to installing it. Because of rising construction costs it is no longer economically feasible to invest the hand labor necessary to custom fit each and every door. For this reason standard size doors and door fittings are used. Once the door is hung, and it is determined that there is insufficient clearance between the bottom of the door and the floor to allow free movement of the door across the floor covering, one of several methods are presently practiced in cutting off the bottom of the door. The first of these would be to remove the door, mark it, and then cut it either freehand or using a strip of wood clamped to the door as a saw guide. The second method is to use the floor as a guide for the baseplate of a circular saw and attempt to cut off the door while it is hanging.

The first method described in the preceding paragraph is disadvantageous because of the expensive labor time it consumes in removing and rehanging the door. The second method is disadvantageous for several reasons. The first of these is that typically cement slab floors or other subfloors are not smooth and level. When a saw is slid across the cement slab or the subfloor any discontinuities or imperfections in its surface are transferred to the saw resulting in either an uneven cut of the door or binding of the saw blade. The second disadvantage of this method is that very few hand-held circular saws are adjustable with respect to the distance of the blade from the edge of the baseplate. Thus, the carpenter has no control over how high the door will be cut off with respect to the floor, but is limited to the particular dimensions achieved in using his saw based on the dimension of the saw blade from the edge of the baseplate. Saw guides or jigs are known which can be used with hand-held circular saws. However, no guides or jigs are known which can be used in cutting off the bottom of a door while the door is hanging.

Further, the known jigs either rely on gravity to retain them in position on a horizontal surface or they must be clamped to the surface of the wood which is being cut if the surface is not horizontal. This, then renders these jigs and guides unusable for vertical surfaces unless clamps are used. Clamps, however, require expenditure of labor time in both mounting and dismounting them and they can mar the surfaces of the door. Further, they can get in the way of the saw which can be dangerous for the operator of the saw.

U.S. Pat. No. 2,614,591 describes an attachment for a plane which allows the door to be planed while it is in a hanging position. However, as anyone skilled with working with wood knows, planing is a very slow technique and as such would never be used by the building industry because of the high labor costs associated with it.

BRIEF SUMMARY OF THE INVENTION

In view of the above discussion it is an object of this invention to provide a door cutting guide or template which can be used on a hanging door. It is a further object to provide a door cutting guide or template which does not require a clamp to be used to maintain it against the surface of the door. Because normally a power saw would be used it is an additional object to provide a guide or template which can be used safely without endangering the carpenter or operator of the saw, and which additionally protects the surface of the door from splintering, etc.

These and other objects as will become evident from the remainder of this specification are achieved by providing a door cutting guide used in conjunction with a saw and a door of the type having two parallel face surfaces separated by two elongated side edges and a top and bottom edge which comprises: an elongated first member sized to fit across the width of one of the face surfaces of said door, said elongated member including two elongated parallel faces, one of which is capable of fitting flush against said face surface of said door, said elongated member including a lower edge capable of resting on a floor and supporting said elongated member above said floor adjacent to said door; said first member including an elongated slot means extending between said two parallel faces along a portion of the length of said elongated member, said slot means forming an opening for the blade of said saw allowing said blade of said saw to pass through said elongated member and contact said door; a retaining means located on one end of said elongated member and capable of retaining said one end of said elongated member in a fixed position with respect to said door with respect to movement of said elongated member in a direction perpendicular to the plane of the face surfaces of the door.

Further, as the saw approaches the end of its cut in the door, the preferred door cutting guide of the invention additionally includes an engagement means located on the same end of the first elongated member as the retaining means and capable of being engaged by a portion of the saw as the saw approaches it to cause the door cutting guide to slide along the face surface of the door in a direction coplanar with the plane of the face surface of the door. Additionally, the door cutting guide includes a second elongated member joined to the first elongated member in a particular arrangement across the length of the lower edge of the first elongated member such that the second elongated member projects outwardly from the first elongated member along the side of the first elongated member which serves as a surface for the baseplate of the saw. The second elongated member serves as a guide plate for the baseplate of the saw as it moves across the first elongated member.

The slot means in the first elongated member can include an elongated cavity which is located parallel to the lower edge of the first elongated member. An elongated insert is sized to fit in this cavity. The elongated insert includes a straight opening which serves as the opening through which the saw blade projects through the first elongated member. After repetitive use which inevitably results in some contact between the saw blade and the elongated insert it is possible to replace the elongated insert by withdrawing it from the cavity and inserting a replacement.

The retaining means preferably includes a retaining member including a plate located on one of the ends of the first member which is held in a parallel relationship with the first member such that the plate fits against the opposite face of the door fixedly retaining the door cutting guide to the door with respect to movement perpendicular to the face of the door, but allowing sliding of the door cutting guide in a direction parallel to the face of the door.

The door cutting guide can include an elevating means located below the second elongated member and therefore positioned between the second elongated member and the floor when the door cutting guide is used. This allows for vertical adjustment of the opening in the door cutting guide with respect to the door resulting in variability of the height of the cut being made in the door.

BRIEF DESCRIPTION OF THE DRAWINGS

This invention will be better understood when taken in conjunction with the drawings wherein:

FIG. 1 is an isometric view of the door cutting guide as used on a door in conjunction with a hand-held circular saw;

FIG. 2 is a top plan view of the components shown in FIG. 1 with the exception that only the blade of the saw is indicated;

FIG. 3 is a side-elevational view in section about the line 3—3 of FIG. 1; however, only a portion of the blade of the saw is shown;

FIG. 4 is an isometric view of the door cutting guide of this invention;

FIG. 5 is a front elevational view of the door cutting guide shown in FIG. 4; and FIG. 6 is a front elevational view of an alternate embodiment of the invention.

The invention shown in the drawings and described in this specification utilizes certain principles and/or concepts which are set forth and claimed in the claims appended to this specification. Those skilled in the art to which this invention pertains will realize that these principles and/or concepts could be used in a number of differently appearing embodiments. Because of this the invention is to be construed in light of the claims and is not to be construed as being limited to the exact embodiments shown in the figures and described in the specification.

DETAILED DESCRIPTION

The door cutting guide 10 of this invention is shown alone in FIGS. 4 and 5. FIGS. 1, 2 and 3 show how the guide is used in conjunction with a vertically suspended door and a hand-held circular saw. Before describing the use of the guide 10 its component parts will first be identified.

The guide 10 has a first elongated member 12 having two parallel faces 14 and 16. In use as hereinafter explained face 16 is placed next to one of the face surfaces of the door and face 14 serves as a support for the baseplate of a circular saw. A second elongated member, or base member 18, is perpendicularly attached to the first elongated member 12 along its lower edge 20. The base member 18 has a particular shape, the function of which will be hereinafter described. Attaching to end 22 of first elongated member 12 is a horizontally oriented plate 24. Attaching to plate 24 is a plate 26. Plate 26 is spaced from first member 12 at a distance which is slightly greater than the thickness of a door. In any one usage, most of the doors will be of a standard thickness and thus the position of plate 26 from first member 12 can be fixed. It is to be realized of course that in special circumstances wherein exceedingly thin or thick doors are used, the distance of plate 26 from first member 12 will be modified to reflect any deviation from a normal thickness.

First member 12, base member 18 and plates 24 and 26 are all suitably joined to other members of this group by gluing, screws, nails, nuts and bolts, or other common fastening means. In the embodiment depicted in FIG. 5 these components are shown as attached to one another with suitable nails and screws.

Plate 24 extends outwardly from face 14 of first elongated member 12 by a short distance. Attaching to plate 24 adjacent to face 14 is an engagement block or member 28. Engagement block 28 is adapted to engage the front end of the baseplate of a circular saw and allows movement of the baseplate of the saw to be transmitted to the first elongated member 12. It is not mandatory to use the engagement block 28 for this purpose. The segment 30 of plate 24 which extends beyond face 14 will serve the same function, i.e., an engagement means, as engagement block 28; however, in actual use in the construction industry it is preferred to use the engagement block 28 because it is replaceable and after multiple uses, if the edge of the baseplate 12 of the circular saw is sharp, this sharp edge tends to abrade the engagement block 28. Thus, the replaceability of the engagement block 28 results in longer service life of the door cutting guide 10.

Extending horizontally across the first elongated member 12 between faces 14 and 16 is an elongated cavity 32. The cavity 32 includes a series of notches, collectively identified by the numeral 34, cut into face 14. The cavity 32 is formed in the elongated member 12 such that it is parallel to lower edge 20 and extends almost across the total length of elongated member 12 from end 22 to the other end 36.

An elongated saw blade guide insert 38 fits into the cavity 32. The insert 38 includes a plurality of ears identified collectively by the numeral 40 equal in number to the notches 34. Further, the ears 40 are spaced along the insert 38 such that when the cutting guide 38 is placed within the cavity 32 the ears 40 align with the notches 34. A plurality of nuts and bolts attach the ears 40 to the portion of the first elongated member 12 located between the notches 34 and face 16. In the place of the nuts and bolts appropriate screws or other fastening means could be used. In addition to the notches 34, two identical notches 42 located at the respective ends of cavity 32, receive the ends of the insert 38. These ends are attached in the notches 42 in the same manner as the ears 40 are attached.

Since the insert 38 is in close proximity to or at times in direct contact with a spinning saw blade, it is preferredly made out of wood. Generally a hard wood would be used which would hold up under repeated use, but would still give should the saw blade inadvertently come in contact with it. After many repeated uses, it is inevitable that the saw insert 38 will be enlarged and notched a few times detracting from its usefulness. When the insert 38 is deemed no longer serviceable it simply is removed from the saw cutting guide 10 and a new insert 38 inserted. The remainder of the components, that is the first elongated member 12, the base member 18, the plates 24 and 26, and the engagement block 28 could be constructed of a variety of material. The simplest of these would be a wood material, either a hard wood or a soft wood. Alternately, any or a portion of these components could be constructed of metal, plastic or the like.

Referring now to FIGS. 1, 2 and 3, a door 44 having two parallel faces 46 and 48 separated by two elongated side edges 50 and 52 and a top edge 54 and bottom edge 56 is shown suspended by hinges collectively identified by numeral 58. The hinges 58 fit onto the surface of a door facing 60 placed between two walls 62 and 64. The door cutting guide 10 is slid against face 46 of door 44 along face 16 of elongated member 12. The edge 50 of the door is slid into the U-shaped cavity 66 formed between plates 26, 24 and elongated member 12. The other end 36 of the door cutting guide 10 is fixedly held against the face 46 of door 44 using one hand 68 as a clamp between the other face 48 of the door 44 and the face 14 of the elongated member 12. A circular saw 70 is rested against the door cutting guide 10 such that edge 72 of its baseplate 74 rests against base member 18 and the bottom surface 76 of the baseplate 74 is directed toward face 14 of elongated member 12. This positions the saw blade 78 in the straight opening 80 in the insert 38. At this point it is noted that the length of the door cutting guide 10 is somewhat greater than the width of the door 44; thus, the elongated insert 38 extends beyond edge 52 of the door 44. This allows the saw blade 78 to slide into the straight opening 80 in insert 38 until the bottom surface 76 of the baseplate 74 is flush against the face 14 of elongated member 12. The saw is then started and slowly slid toward end 22 of the door cutting guide 10.

As viewed from above in FIG. 2 the rotation of the saw blade 78 is clockwise. The teeth of the saw blade 78 therefore are cutting the door as they move in the direction from face 48 toward face 46. Face 46 is firmly supported against face 16 of the elongated member 12. This serves to prevent face 46 of door 44 from splintering as the saw moves through it. Thus, the guide in addition to assisting in sawing the door 44 also assists in preventing splintering of the door 44.

As can be seen in FIG. 1 the edge 50 of the door 44 projects beyond end 82 of the opening 80 in the elongated insert 38. Because of this, the segment of the door between end 82 and edge 50 could not be cut without cutting into that portion of the elongated member 12 between end 32 of the insert 38 and plate 24. However, before the saw blade 78 cuts through end 82 of insert 38 the front edge 84 of the baseplate 74 contacts the engagement block 28. Further, movement of the saw 70 in a direction toward edge 50 of door 44 causes the door cutting guide 10 to slide along the door 44 in a direction toward the left hand side of FIG. 1. While this is happening the operator loosens his grip of his hand 68 slightly allowing the door cutting guide 10 to slide along his hand. The door cutting guide 10 continues to slide until the saw blade 78 completely cuts through the door 44 exiting out of edge 50.

The whole cutting operation of the door 44 can be done in one smooth continous manner. The door cutting guide 10 is simply positioned next to the door 44 and slid along the door 44 until edge 50 is safely within the U-shaped channel 66. The saw is inserted, moved along the door cutting guide 10 and smoothly exits edge 50.

Because of the ease of operation in using the door cutting guide 10 a carpenter can rapidly trim the bottom of a succession of doors 44 in a house. Aside from the accurate trimming of the door the ease of operation results in economy because of the decrease in labor expended.

The opening 80 in the elongated insert 38 can be preformed during manufacture of the door cutting guide 10. Any such preforming of the opening 80 would be done in light of utilizing standard dimensions of a particular circular saw. It is preferable, however, that the opening 80 be custom-made to each individual circular saw because of small variations in the dimensions of the saw and also in the thickness of the saw blade 78, etc.

To custom form the opening 80, the first time the door cutting guide 10 is to be used the carpenter or other operator positions the door cutting guide 10 on an appropriate support surface and then positions the circular saw 70 such that its front edge 84 is against face 14 of elongated member 12 and the edge 72 of the baseplate 74 is against the base member 18. The saw is turned on and pivoted about the front edge 84 which brings the blade 78 into contact with the elongated insert 38. When the blade has completely cut through the insert 38 the saw is moved along the door cutting guide 10 toward end 36. When the saw 70 approaches end 36 the operator shuts off the saw and withdraws it. This custom forms the opening 80 in the elongated insert 38. The opening 80 is thus very precisely aligned with the individual dimensions of the saw 70 and the blade 78. If a new elongated insert 38 is later substituted in the door cutting guide 10 a custom opening 80 is likewise formed in the new insert 38. The ease of changing the insert 38 also allows the owner of a door cutting guide 10 to have a series of custom inserts 38, each individually tailored to the dimensions of a series of circular saws 70. In place of circular saw 70 inserts 38 could also be cut to correspond to the dimensions of a power sabre or reciprocating saw. While the door cutting guide 10 would normally be used with a power tool, alternatively it could also be used as a guide for a hand saw.

The shape of base member 18 is designed to allow use of the door cutting guide in very tight spaces and without regard to which side of the door the hinges are placed. The base member 18 is cut at an angle near end 36 forming oblique surface 86. The oblique surface 86 allows the guide to be used even though the door 44 lies very close to a wall 62. In FIG. 2 the door 44 makes approximately a 45 degree angle with wall 62. However, it is evident from looking at FIG. 2 because of the shape of oblique surface 86 the door 44 could be brought much closer to wall 62 and still allow use of the door cutting guide 10. Depending exactly on the angle which the oblique surface is cut, the door 44 need be positioned from the wall 62 by only a very slight amount such that the angle between the door 44 and the wall 82 is only a few degrees, as, for example, approximately 10 degrees.

In FIG. 2 the door cutting guide 10 is shown in relationship to the door 44 such that edge 50 of the door 44 fits within U-shaped channel 66 of the door cutting guide 10. If the hinges 58 supporting the door 44 were mounted along edge 50 instead of edge 52, as depicted in FIG. 2, it would be necessary in cutting the door 44 to reverse the placement of the door cutting guide 10 as might be expected. This is because of the shape of the base member 18 near end 22. Near end 22 the base member 18 has a notched surface 88 which allows for placement of the door cutting guide 10 such that the U-shaped channel 66 is located at the side of the door wherein the door is hinged. When the guide 10 is slid near the end of the cutting operation the notch surface 88 allows the guide to slide past the door facing 60 and any molding thereon a distance sufficient to allow the saw blade 78 to cut through edge 52. The unique shape of the base member 18 as defined by oblique surface 86 and notched surface 88 allows the user of the door cutting guide 10 to use the cutting guide 10 on any door regardless of which side it is hinged on, and in which direction it opens or closes.

In the embodiment of the door cutting guide 10 illustrated in FIG. 4 the height of the cut made in the door 44 is determined by the spatial relationship between the opening 80 and the base member 18. If it is desired to increase the height of the cut—that is, make a bigger space between the bottom of the door and the floor—this can easily be done by simply inserting a shim between the base member 18 and the floor. Thus, if a quarter-inch piece of plywood was first layed on the floor and then the door cutting guide positioned over the plywood, the cut in the door would be one-quarter inch higher than the cut without the piece of plywood. As is evident, any height of cut can be achieved by inserting appropriately spaced shims.

In the alternate embodiment shown in FIG. 6 the door cutting guide 90 is identical in all respects to the door cutting guide 10 as previously described except that it includes an elevating means allowing for infinite variety of adjustment with respect to the distance of the opening 80 above the surface of the floor. Positioned below the base member 18 is a sub-base member 92 identical in shape to the base member 18. Interspaced between base member 18 and sub-base member 92 is an elevating member 94.

Elevating member 94 is composed of two identical scissoring members 96. The scissoring members 96 are appropriately hinged to the base member 18 and the sub-base member 92 by hinge pins 98 appropriately journaled. Connecting the scissoring members 96 is a linking rod 100 having an adjustment knob 102 located thereon. The scissoring members 96 are each constructed of four identical levers 104 which are either pivotally hinged to each other at hinge pins 106, pivotally hinged to either base member 18 or sub-base member 92 at hinge pins 98, or hinged to adjusting nuts 108.

The rod 100 has right hand threads on one of its ends and left hand threads on its other end. One of the nuts 108 is threaded to receive the right hand threads and the other nut 108 is threaded to receive the left hand threads of rod 100. The result of this is that as rod 100 is turned by turning knob 102, the nuts 108 move toward and away from each other depending on the direction of rotation of adjustment knob 102. If the nuts 108 move away from each other the scissoring members 96 are expanded vertically lifting base member 18 with respect to sub-base member 92 and if the nuts 108 move toward each other the scissoring members 96 are expanded horizontally bringing base member 18 and sub-base member 92 closer together.

I claim:

1. A door cutting guide used in conjunction with a saw and a door of the type having two parallel face surfaces separated by two elongated side edges and a top and bottom edge which comprises:

an elongated first member sized to fit across the width of one of the face surfaces of said door, said elongated member including two elongated parallel faces, one of which is capable of fitting flush against said face surface of said door, said elongated member including a lower edge capable of resting on a floor and supporting said elongated member above said floor adjacent to said door;

said first member including an elongated slot means extending between said two parallel faces along a portion of the length of said elongated member, said slot means forming an opening for the blade of said saw allowing said blade of said saw to pass through said elongated member and contact said door;

a retaining means located on one end of said elongated member and capable of retaining said one end of said elongated member in a fixed position with respect to said door with respect to movement of said elongated member in a direction perpendicular to the plane of the face surfaces of the door.

2. The door cutting guide of claim 1 wherein:

the other of said two parallel faces is capable of serving as a support for the baseplate of a portable circular saw;

said slot means includes an elongated straight opening between the two parallel faces of said elongated member and said lower edge of said elongated member is parallel to said straight opening.

3. The door cutting guide of claim 1 including:

a saw engagement means located on said one end of said elongated member wherein said retaining means is located and capable of being engaged by a portion of said saw as said saw approaches said one end of said elongated member wherein said retaining means is located such that after said saw engages said engagement means further movement of said saw causes said elongated member to slide along said face surface of said door in a direction coplanar with the plane of the face surface of said door.

4. The door cutting guide of claim 3 including:

a second elongated member joined to said first elongated member and located along the length of said lower edge of said first elongated member such that said first elongated member is perpendicular to said second elongated member;

a portion of said second elongated member projecting outwardly from said first elongated member on the side of said first elongated member wherein the other of said two parallel faces is located such that one of the edges of said baseplate of said portable circular saw contacts said second elongated member as said baseplate of said portable saw moves across the other of said two parallel faces.

5. The door cutting guide of claim 4 wherein:

said slot means includes said first member having an elongated cavity located parallel to said lower edge across a portion of the length of said first member, an elongated insert sized to fit in said elongated cavity and including said straight opening located in said elongated insert and positioned in said elongated insert such that said straight opening is parallel to said lower edge, joining means for joining said elongated insert in said cavity in said first elongated member.

6. The door cutting guide of claim 5 including:
an elevating means located below said second elongated member, said elevating means capable of positioning said second elongated member with respect to a support surface in a plurality of positions such that when said elevating means is resting on a support surface said first elongated member can be moved along the face surface of said door in a direction perpendicular to said floor.

7. The door cutting guide of claim 4 wherein:
said retaining means comprises a retaining member located on said one end of said first member and including a plate located parallel to said two parallel faces and spaced from said one of said parallel faces which is capable of fitting flush against the face surface of said door by a distance slightly greater than the thickness of said door measured between its two parallel face surfaces.

8. The door cutting guide of claim 7 wherein:
said saw engagement means comprises an engagement member located on the other of said two parallel faces on said one end of said first elongated member and projecting outwardly perpendicular to said other of said two parallel faces forming an impediment in the pathway of said baseplate across said other of said parallel faces.

9. The door cutting guide of claim 8 wherein:
said slot means includes said first member having an elongated cavity located parallel to said lower edge across a portion of the length of said first member, an elongated insert sized to fit in said elongated cavity and including said straight opening located in said elongated insert and positioned in said elongated insert such that said straight opening is parallel to said lower edge, joining means for joining said elongated insert in said cavity in said first elongated member.

10. The door cutting guide of claim 9 including:
an elevating means located below said second elongated member, said elevating means capable of positioning said second elongated member with respect to a support surface in a plurality of positions such that when said elevating means is resting on a support surface said first elongated member can be moved along the face surface of said door in a direction perpendicular to said floor.

11. The door cutting guide of claim 10 wherein:
said elevating means includes scissoring means capable of maintaining said straight opening in a parallel relationship with a support surface.

* * * * *